S. T. WHITE.
DRIVING MECHANISM FOR WASHING MACHINES.
APPLICATION FILED AUG. 14, 1915.

1,275,512.

Patented Aug. 13, 1918.
4 SHEETS—SHEET 1.

Witnesses:
W. T. Smith
Florence Mitchell

Inventor:
Samuel T. White
by Frank D. Thomason
Atty.

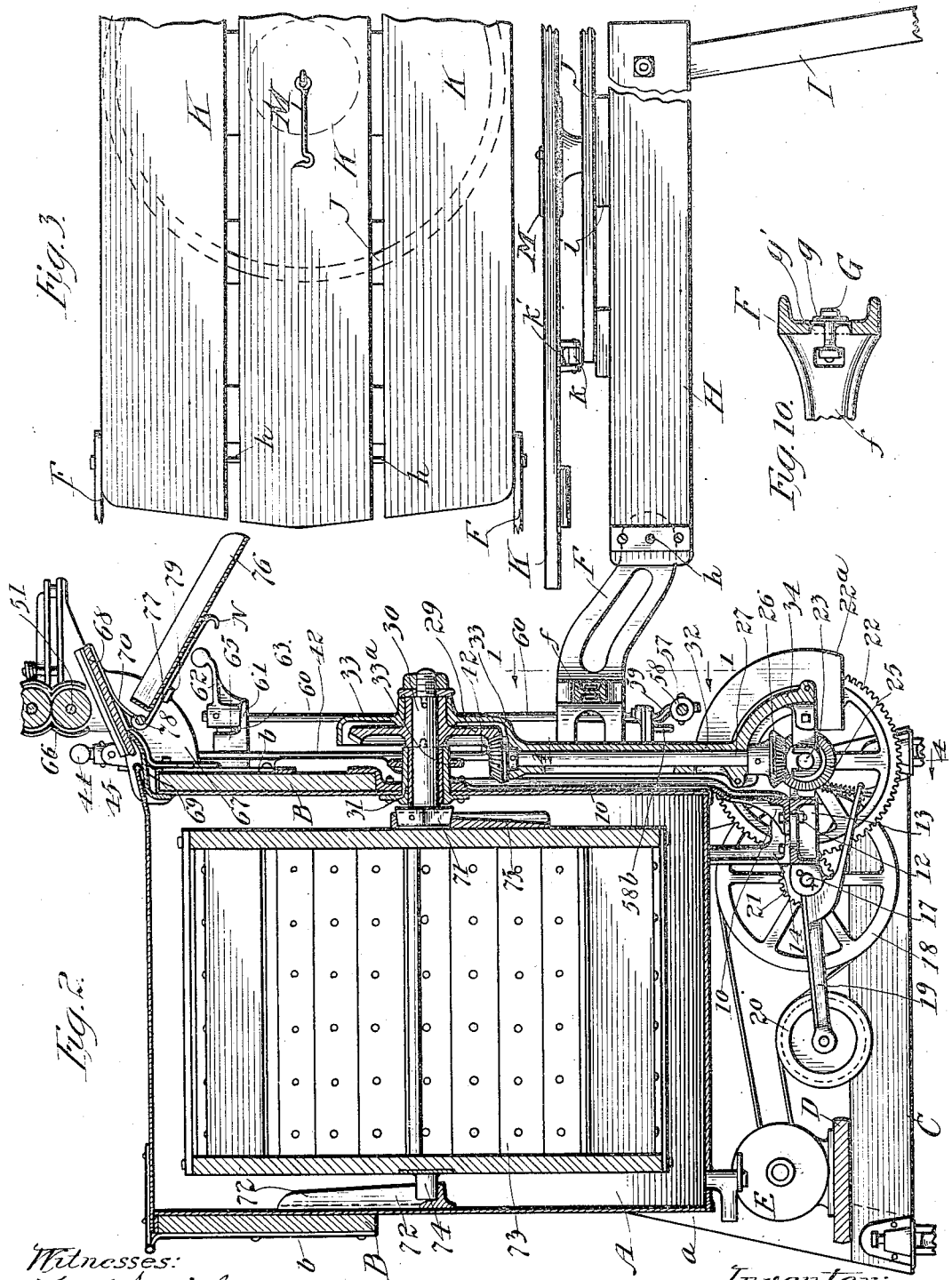

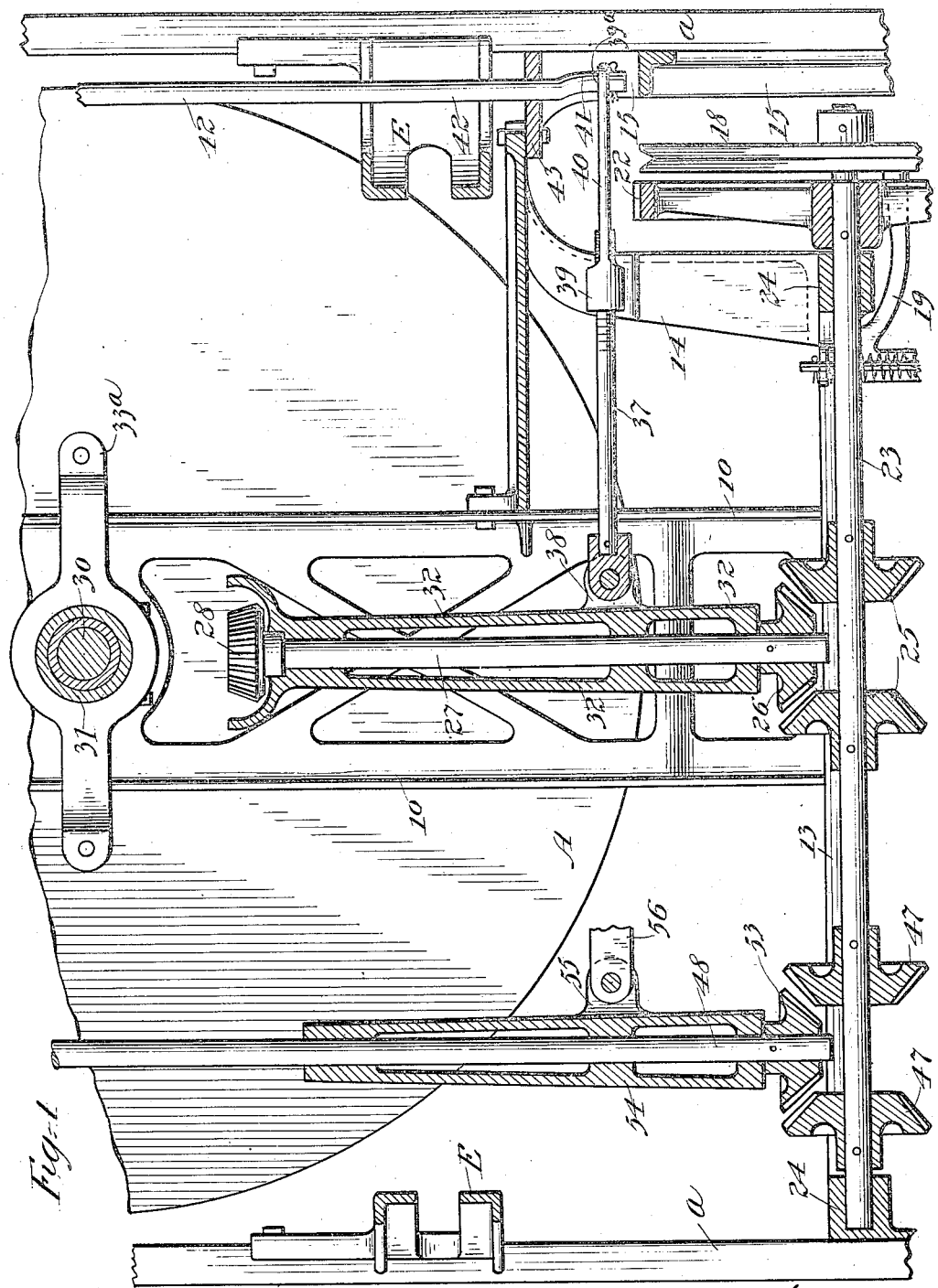

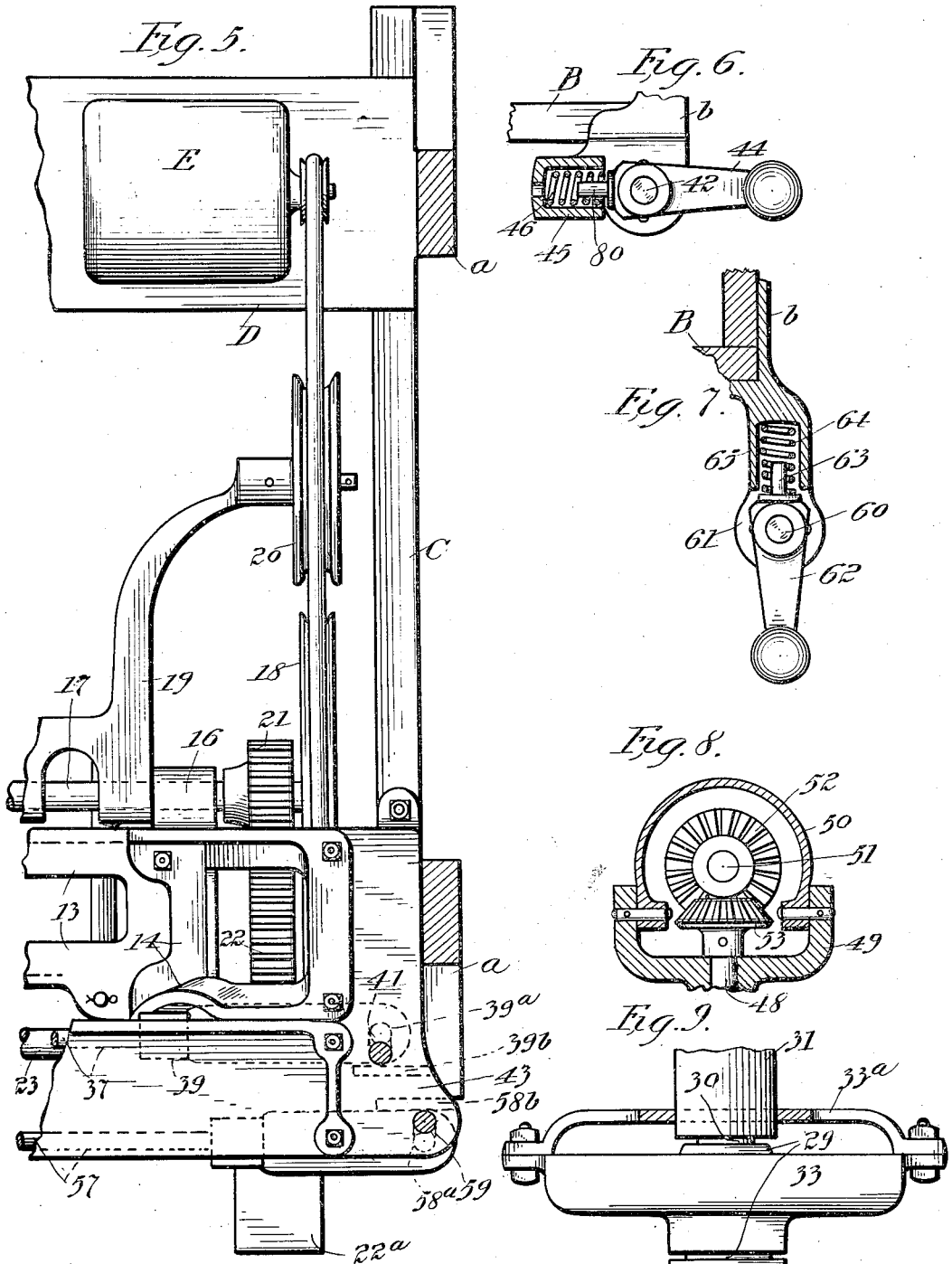

UNITED STATES PATENT OFFICE.

SAMUEL T. WHITE, OF DAVENPORT, IOWA.

DRIVING MECHANISM FOR WASHING-MACHINES.

1,275,512.   Specification of Letters Patent.   Patented Aug. 13, 1918.

Application filed August 14, 1915. Serial No. 45,467.

*To all whom it may concern:*

Be it known that I, SAMUEL T. WHITE, a citizen of the United States, residing at Davenport, in the county of Scott and State of Iowa, have invented new and useful Improvements in Driving Mechanism for Washing-Machines, of which the following is a full, clear, and exact description.

My invention relates to domestic washing machines in which the soiled apparel and other soiled household fabrics are placed in a cylinder and cleansed by the revolution of said cylinder in a receptacle partly filled with saponified water.

The object of my invention is to combine with such a machine all of the apparatus usually employed in a domestic laundry for wringing, rinsing and bluing the wash, in a compact form that can be easily and quickly manipulated to reduce it to the least possible space preparatory to its being moved out of the way, and which can be opened up and made ready for use without the exercise of any considerable physical exertion just as quickly and easily. A further object of my invention is to construct and arrange the mechanism of the machine, and to accomplish the above objects and functions of a machine of this character in a comparatively simple and economical manner with regard to its strength and durability and with regards for the convenient handling of the same. These and other objects I accomplish by the means hereinafter fully described, and as particularly pointed out in the claims.

In the drawings:

Fig. 2 is a vertical longitudinal section taken on dotted line 2—2, Fig. 1.

Fig. 3 is a plan view of a part of the turntable used in connection with said machine.

Fig. 4 is a transverse section of the lower portion of my improvements, taken on dotted line 4—4, Fig. 2, and drawn to a larger scale.

Fig. 5 is a horizontal section of a portion of the machine, taken on dotted line 5—5, Fig. 1, and drawn to the same scale as Fig. 4.

Fig. 6 is a horizontal section of a fragment of the machine taken on dotted line 6—6, Fig. 1.

Fig. 7 is a horizontal section of another fragment taken on dotted line 7—7, Fig. 1.

Fig. 8 is a vertical section of the broken away upper end of one of the vertical shafts and intermeshing gear on the adjacent end of the lower wringer roller shaft taken on dotted line 8—8, Fig. 1.

Fig. 9 is a plan view of the broken away outer end of the spindle bearing and casing constituting the upper end of the support in which the other vertical shaft is journaled.

Fig. 10 is a detail view showing a transverse section through the joint between the bracket that supports the bench of my machine and the cross-bar connecting both brackets.

Figure 1:
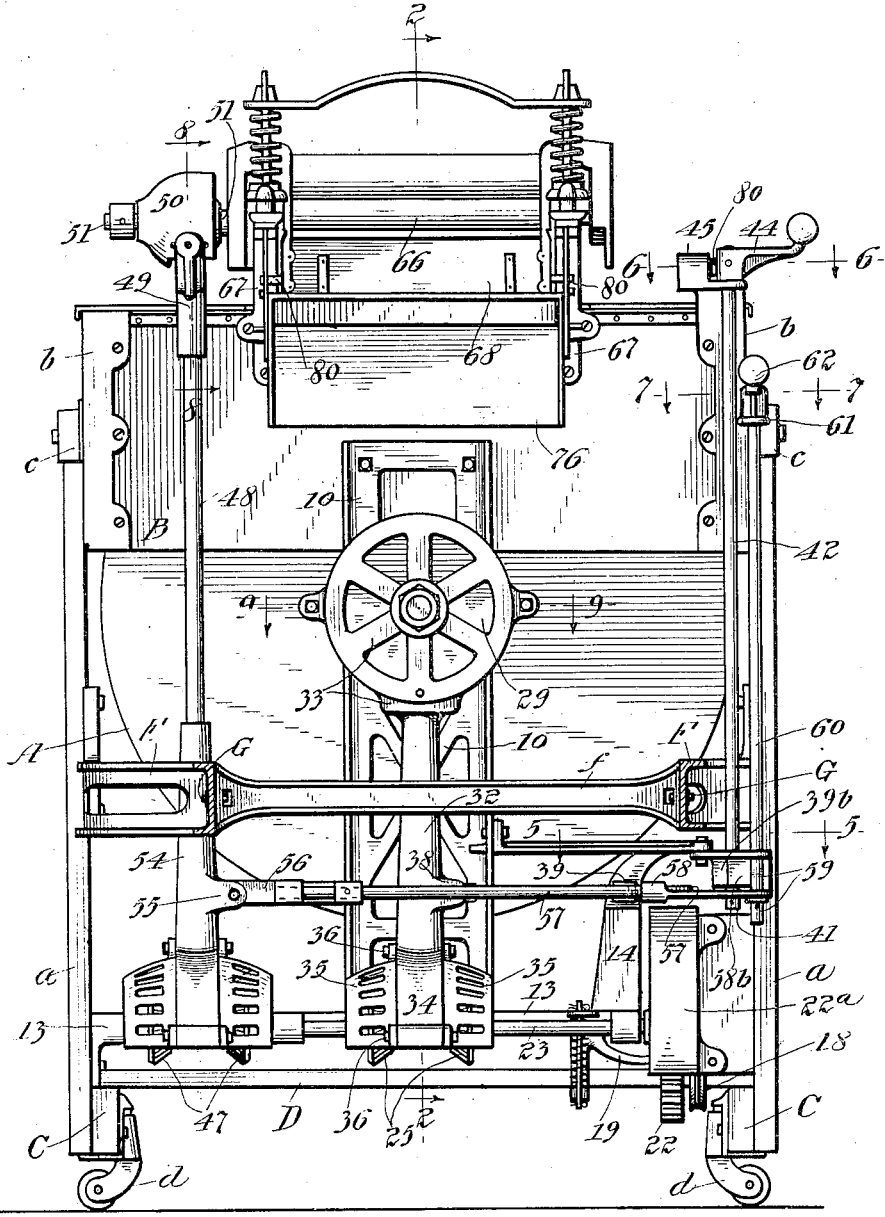
Figure 1 is a front elevation of my improved washing machine.

Referring to the drawings, A represents a sheet metal receptacle or tub the upper portion of which is rectangular and the bottom of which is, preferably, made round or semi-circular in transverse section. The upper rectangular portion of this receptacle is suitably inclosed within a rectangular frame-work B of boards, which, at the corners, are suitably secured together and reinforced by vertically disposed angle-iron corner-plates *b*. This receptacle A is supported by means of legs *a*, *a*, whose upper ends are secured in metal sockets *c* bolted to the side boards of frame B, and spread apart as they extend downward therefrom to their lower ends, which latter are connected by longitudinal rails C and have suitably constructed casters *d*, substantially as shown. The rear portions of rails C are connected by a transverse wooden platform D upon which, as will hereinafter more fully appear, the motor E is mounted.

About the center of height of the forward legs *a*, *a*, preferably, above the lowest segment of the bottom of receptacle A, said legs are provided with brackets, F, F, that project forward therefrom, and which are connected by a metal cross-bar *f*. The ends of this cross-bar are detachably secured to said brackets by means of tenons *g* that extend therefrom into vertical slots in the webs of said brackets, and by means of bolts G tapped longitudinally into said tenons, between which and the heads of the bolts washers *g'* are interposed. The forward end portions of these brackets are, preferably, curved downward and have the adjacent ends of side-bars H of the frame of a bench pivoted thereto by means of a transverse pivotal bolt *h*. The opposite ends of said side-bars H are supported by folding legs I, and mediate their ends said rails are connected by cross-boards, $i$ upon which an annular track J is suitably mounted and secured. A turntable or platform K of any suitable construction is pivotally mounted upon this bench concentric with angular track J, and it is provided with a suitable number of anti-friction rollers $k$ that are journaled between lugs projecting down from a suitable plate $k'$ secured to the underside of the turntable. This turntable can be easily dismounted from the bench and said bench then folded up against the side of the machine, as will hereinafter more fully appear.

The ends of receptacle A are flat and a vertically disposed metal frame 10 is bolted to its forward end, the vertical edges of which are flanged forward to give it the necessary strength, and between these edges its web is provided with suitable openings in order to make it lighter. The upper portion of frame 10 laps against and is secured to the forward surface of the board forming the front of rectangular frame B inclosing the upper part of receptacle A, and said frame 10 is bent rearwardly below the lower edge of this board and then extends downward to a point below the bottom of receptacle A, and has its lower end provided with a rearwardly projecting foot through which bolts 12 pass that secure it to a transverse metal platform 13.

As shown in the drawings, the left hand end of this platform 13 is bent downward next the inner surface of the adjacent front leg (to which it is secured) and rests upon the front end of rail C. Its opposite end is secured by bolts to the lower flanged edge of an inverted L-shaped hanger 14 the end of whose opposite horizontal portion rests upon and is secured to the flanged upper end of a standard 15, the base of which latter rests upon and is secured to the forward end portion of the adjacent rail C. The rear edge of platform 13, adjacent hanger 14 is provided with two lugs 16, 16, in which a transverse drive-shaft 17 is journaled, and the end of this shaft has a concaved pulley 18 secured thereto which revolves in the arched space made by hanger 14 and standard 15 and is connected by a suitable belt to and is driven by motor E. Between lugs 16, 16, the knuckles of an arm 19 are pivotally mounted on shaft 17, and this arm extends to the rear and then curves laterally back of pulley 18 and has a pulley 20 mounted on its rear end that engages and takes on the slack of the belt connecting the motor to pulley 18. Between pulley 18 and the nearest bearing of shaft 17, a pinion 21 is securely mounted on said shaft, and this pinion 21 engages and revolves a comparatively large gear 22 on the adjacent end of the transverse main-shaft 23 of the machine, which is journaled in lugs 24, 24, projecting from the forward edge of platform 13 at and between its ends, as shown in the drawings. If desired, a semi-circular casing 22ª can be provided to inclose the forward half of standard 15 by means of lugs and bolts, as shown in the drawings.

Main-shaft 23 extends from near one front leg to the other of the machine, and midway between said legs, and on either side of a point immediately below the center from which the curvature of the bottom of the receptacle A is struck, said main-shaft has two spaced apart corresponding beveled gears 25, 25, secured thereto that face each other, and one or the other of these beveled gears 25 is adapted to be engaged by pinion 26 on the lower end of a vertically disposed pendulous shaft 27. The upper end of this shaft 27 is provided with a beveled pinion 28 which engages a beveled gear 29, which latter is greater in diameter and is mounted and secured on the extended end of a longitudinally disposed spindle 30. This spindle is journaled in bearing 31 consisting of a metal sleeve having its inner end flanged and secured by riveting or otherwise to the front end of receptacle A, concentric to the center from which the curvature of its bottom is struck. Shaft 27 is supported by and journaled in bearings at the top and bottom of the tubular portion of a vertically disposed pendulous hanger 32, and the upper end of this tubular portion is made integral with the inner edges of the lowest segment of the circumferential flange of a circular casing 33, which latter has a central gear 29 and has a horizontal bridge 33ª connecting its opposite edges that is journaled on the outer extended end of bearing 31. The lower end of the tubular portion of hanger 32 terminates in a forwardly and downwardly extending quadrant-shaped guard 34, to which is secured the quadrant-shaped casings 35, 35, near the upper and lower ends thereof by means of suitable bolts and nuts 36. This hanger can be swung from side to side to bring pinion 26 into engagement with one or the other of beveled gears 25 by means of connecting-rod 37, which latter is provided with a head at one end that is pivotally connected between lugs 38 projecting laterally from hanger 32, and at its other end screws into a suitable turn-buckle 39 on the contiguous end of an extension 40.

The end of this extension 40 opposite its turn-buckle 39 is pivotally connected to the offset lower end 41 of a vertical rock-shaft 42 which, near its lower end, is journaled in an arm 43 projecting forward from the upper end of standard 15, and is journaled at its upper end in a lug made integral with the upper end of the right hand corner-plate $b$ of rectangular frame B. The upper end of rock-shaft 42 extends through its bearing and has a crank 44 secured thereto, and the boss of this crank has the side thereof, opposite that from which the arm of the crank projects, disposed at right angles to the length of the same, and has the longitudinally disposed sides thereof disposed in planes substantially parallel to the length of said crank arm. At one side of the lug it is provided with a housing 45 and the side of this housing next the boss of the crank is recessed or bored out to provide a pocket for a coil expansion-spring 46. This coil expansion-spring 46 has a headed plug 80 inserted in its end that bears against one of the flat surfaces of the boss of crank 44 and holds the crank and rock-shaft 42 in any one of three positions to which they may be turned.

Near the end of main-shaft 23 opposite gear 22 said shaft has two beveled pinions 47, 47, securely mounted thereon that are spaced apart and face each other. These pinions 47 are adapted to be engaged by a pinion 53 on the lower end of a vertically disposed pendulous shaft 48, the upper end of which is journaled in the tubular lower portion of a hanger 49 whose upper end is bifurcated and has the extremities of said bifurcations pivotally connected to a cowl-shaped casing 50 loosely mounted on the end of drive-shaft 51 of a suitable clothes-wringer. The upper end of shaft 48 has a beveled gear secured thereto that engages a corresponding beveled gear 52 securely mounted upon shaft 51 and inclosed within casing 50. When shaft 48 is in such position that pinion 53 will not engage with either of said pinions 47 said shaft will remain stationary, but when said shaft is in such position that pinion 53 will engage the right hand pinion 47 said shaft 48 will be revolved in one direction, and when said shaft is moved so as to bring pinion 53 into engagement with the left hand pinion 47 said shaft 48 will revolve in the opposite direction.

In order to move shaft 48 laterally, I have surrounded the lower end thereof, above pinion 53, with a sleeve 54, substantially as shown in Figs. 1 and 4 of the drawings, and I pivotally connect to the lugs 55 projecting from the same, a link 56, which latter has lugs projecting from its outer end to which the contiguous end of a connecting-rod 57 is secured. The opposite screw-threaded end of connecting-rod 57 is screwed into a turn-buckle 58, and this turn-buckle has a longitudinally extending portion the opposite end of which is pivotally secured to the lower offset end 59 of a vertically disposed rock-shaft 60. The lower end of rock-shaft 60 is journaled in the same arm 43 in which the lower end of rock-shaft 42 is journaled, and the upper end of said shaft 60 is journaled in a lug 61 projecting forward from about the center of height of the same corner-plate $b$ that provides a bearing from the upper end of shaft 42. The upper end of shaft 60 extends through its bearings and has a crank 62 secured thereto the construction of the boss of which is the same as that of crank 44. This boss is likewise engaged by a plug 63 seated in the adjacent end of coil expansion-spring 64, which latter is housed in a housing 65 similar to housing 45. When crank 62 is turned shaft 60 is turned thereby and moves the connecting-rod 57 longitudinally and swings shaft 48 in the direction desired to engage or disengage either of pinions 47 to impart the necessary rotation to shaft 48 and thereby impart motion to drive-shaft 51 of the clothes-wringer 66.

Shaft 51 is an extension of the shaft of the lower roller of clothes-wringer 66, the general construction of which is the same as those now in extensive use. It possesses this difference of construction, however, namely, the lower ends of its upright side-frames 67, 67, are bent inward toward and terminate in suitable screw-plates that are secured to the front board of rectangular frame B, of receptacle A, and its inclined drain-board 68, secured between these side-frames below the wringer rollers, discharges into a drip-pan 69. This drip-pan consists of a somewhat gutter-shaped strip of metal one longitudinal edge of which is higher than the other and is bent up under said drain-board, and its opposite longitudinal edge is flanged downward so as to discharge any drippings into receptacle A. The ends of this drip-pan are flanged upward so as to retain the drippings and direct the discharge thereof into receptacle A.

The drain-board is pivoted by means of trunnions 80, 80, projecting from its end edges that engage suitable bearings in the side-frames of the wringer, and it can be inclined either toward receptacle A or outward. In order to retain it in either of these positions, I have provided its underside with one or more transverse somewhat bow-shaped springs 70 that are secured at their outer ends to the drain-board and press hard against a transverse bar 78 that connect side-frames 67 at about their centers of length.

The inner end of spindle 30 terminates in a head 71 having rectangular or polygonal sides, and the opposite or rear end of receptacle A has an open bearing 72. A hollow cylinder 73, whose circumference is perforated, has a journal extending axially to the rear from its rear side that engages and is seated in open bearings 72 secured to the inner surface of the rear side of receptacle A, and the front side of said cylinder is provided with a plate 75 secured thereto, one end of which is provided with a depression that is concentric with the axis of the cylinder and is shaped so that head 71 of spindle 30 can enter the same and so interlock therewith that when spindle 30 is revolved the motion thereof will be imparted to said cylinder.

In order to direct the clothes that are run through the wringer into the tub on the turn-table, I have provided a tray 76, the upper horizontal edge of which is placed under drain-board 68 from which it inclines outward and downward. The upper edge and the end edges of this tray are flanged upward, and its length is such that it fits tightly in between side-frames 67 of the wringer. It is held in place by means of hooks 77 that consist of transverse strips of band iron that are secured to the underside of the bottom of the tray and have their upper ends extended beyond the upper edge of the same and hooked so as to enable them to catch on a transverse bar 78 that connects side-frames 67, and the lower part of the tray has its sides resting on lugs 79 integral with and projecting laterally from the side-frames 67. The outer edge of this tray is such a distance from the mechanism assembled in front of the machine that the clothes dropping therefrom as they come from the wringer clear said mechanism and can fall unobstructed into the tub below.

The length of the bench and the turn-table K mounted thereon is such that when it is closed upward against the machine to get it out of the way it can be retained in its raised position by means of a hook M which is adapted to be caught on the hooked end of a transverse metal strip N secured to the underside of tray 76.

In order to limit the movement of the offsets of the lower ends of rock-shafts 42 and 60 and the reciprocable throw of the connecting-rods engaged thereby, I have provided the underside of arm 43 with downwardly projecting stop-lugs 39$^b$ and 58$^b$, respectively, substantially as shown in dotted lines in Fig. 5, and in other figures of the drawings.

What I claim as new is:

1. In a device of the class described, a rotatable spindle, and a gear on the outer end of said spindle, in combination with a pendulous hanger the upper end of which is pivotally mounted on said spindle, a vertical shaft journaled in said hanger, pinions on the ends of said vertical shaft the uppermost one of which engages said gear, a transverse main-shaft suitably geared to the lower pinion of said vertical shaft, a motor, and speed reducing means for imparting the motion of said motor to said main-shaft.

2. In a device of the class described, the combination of a rotatable spindle, and a gear on the outer end of said spindle, in combination with a pendulous hanger the upper end of which is pivotally mounted on said spindle, a vertical shaft journaled in said hanger, pinions on the ends of said vertical shaft the uppermost one of which engages said gear, a transverse main-shaft, a pair of spaced apart miter gears secured to said main-shaft which are adapted to be engaged by the lowermost pinion, means for swinging said pendulous shaft, a motor, and speed reducing means for imparting the motion of said motor to said main-shaft.

3. In a device of the class described, the combination of a rotatable spindle, a gear on the outer end of said spindle, in combination with a pendulous hanger the upper end of which is pivotally mounted, the upper end of which terminates in a circular casing that is fulcrumed on the boss of said gear and which has a tubular depending body portion, a vertical shaft journaled in the tubular portion of said hanger, pinions on the ends of said vertical shaft the uppermost one of which engages said gear, a transverse main-shaft suitably geared to the lower pinion of said vertical shaft, a motor and speed reducing means for imparting the motion of said motor to said main-shaft.

4. In a device of the class described, a spindle, a gear on the outer end of said spindle, in combination with a pendulous hanger the upper end of which terminates in a circular casing that is fulcrumed on the boss of said gear and which has a tubular depending body portion and has its lower end formed into a quadrant-shaped guard, a vertical shaft journaled in the tubular portion of said hanger, pinions on the ends of said vertical shaft the uppermost one of which engages said gear, a transverse main-shaft suitably geared to the lower pinion of said vertical shaft, a pair of spaced apart miter gears secured to said main-shaft one or the other of which is adapted to be engaged by the lowermost pinion of said vertical shaft, means for moving said hanger, a motor and speed reducing means for imparting the motion of said motor to said main-shaft.

5. In a device of the class described, a spindle, a gear on the outer end of said spindle, in combination with a pendulous hanger the upper end of which terminates in a circular casing that is fulcrumed on the boss of said gear and which has a tubular depending body portion and which has its lower end formed into a quadrant-shaped guard, a vertical shaft journaled in the tubular portion of said hanger, pinions on the ends of said vertical shaft the uppermost one of which engages said gear, a transverse main-shaft suitably geared to the lower pinion of said vertical shaft, a pair of spaced apart miter gears secured to said main-shaft one or the other of which is adapted to be engaged by the lowermost pinion of said vertical shaft, a transverse connecting-rod pivotally attached at one end to said hanger, a vertical rock-shaft to the lower offset end of which the adjacent end of said connecting-rod is pivoted, devices for retaining said rock-shaft in any of several positions, a motor, and speed reducing means for imparting the motion of said motor to said main-shaft.

6. In a device of the class specified, the combination of a supporting frame comprising legs, oppositely disposed rails each connecting the lower ends of a separate pair of said legs, a transverse plank connecting the rear portions of said rails, a transverse platform one end of which is supported on the forward portion of one rail, an inverted L-shaped hanger to the lower edge of the vertical portion of which the adjacent opposite end of said platform is secured, in combination with a transverse drive-shaft journaled in bearings projecting from the rear edge of said platform near said hanger, a concaved pulley arched over by said hanger, a transverse main-shaft journaled in bearings projecting from the front edge of said platform, speed-reducing gearing connecting said shafts, a pendulous vertical shaft, and hanger in which the same is journaled pivotally mounted on said spindle, gearing connecting the upper end of said vertical shaft and spindle, a beveled pinion on the lower end of said vertical shaft, two beveled pinions secured to the main-shaft and facing each other on either side of the pinion on the vertical shaft, and means for swinging said hanger laterally.

7. In a machine of the kind specified, a support consisting of a pair of legs on each side, longitudinal rails connecting each pair, and a transverse board connecting the rear portions of said rails, a transverse platform one end of which is supported in the forward portion of one of said rails, a standard supported opposite thereto on the other rail, an inverted L-shaped bridge connecting the top edge of the standard with the adjacent end of the platform, in combination with a transverse drive-shaft journaled in bearings integral with the rear edge of said platform, a transverse main-shaft journaled in bearings integral with the forward edge of said platform, a motor on said board that revolves said drive-shaft, speed reducing gearing connecting said drive-shaft and motor shaft, a spindle and means having an oscillatory movement for connecting said main-shaft and spindle.

8. In a device of the class described, in combination, a spindle, a vertically disposed pendulous shaft geared to the outer end of the spindle and constructed to swing about said spindle, a transverse main-shaft suitably geared to the lower end of the pendulous shaft, a motor, and means for imparting the motion of the motor to the main-shaft.

9. In a device of the class described, in combination, a rotatable spindle, a gear on the outer end of the spindle, a pendulous hanger the upper end of which is mounted on the spindle, a vertical shaft journaled in the hanger, pinions on opposite ends of the shaft the upper one of which engages the gear on the spindle, a main-shaft suitably geared to the lower pinion of said vertical shaft, and a motor connected to the main-shaft.

10. In a device of the class described, in combination, a rotatable-spindle, a gear on the outer end of the spindle, a pendulous-hanger the upper end of which is mounted on the spindle, a vertical shaft journaled in the hanger, pinions on opposite ends of the shaft the upper one of which engages the gear on the spindle, a main-shaft suitably geared to the lower pinion of said vertical shaft, and means provided on the main-shaft whereby the vertical shaft is rotated in opposite directions.

11. In a device of the class described, in combination, a rotatable spindle, a gear on the outer end of the spindle, a pendulous hanger the upper end of which is mounted on the spindle, a vertical shaft journaled in the hanger, pinions on opposite ends of the shaft one of which engages the gear on the spindle, a main-shaft suitably geared to the lower pinion of the vertical shaft, and means connected to the hanger for oscillating same to cause the gear on the lower end of the vertical shaft to mesh with the gear on the main-shaft whereby movement may be imparted to the vertical shaft.

12. In a device of the class described, in combination, a spindle, a vertically disposed pendulous shaft geared to the outer end of the spindle, a main-shaft suitably geared to the lower end of the pendulous shaft, and means whereby a reverse movement is imparted to the vertical shaft.

In witness whereof I have hereunto set my hand this 7th day of August, 1915.

SAMUEL T. WHITE.

Witnesses:
JOHN S. COX,
ARTHUR T. BLAKEMORE.